(12) United States Patent
Groothius et al.

(10) Patent No.: US 8,875,118 B1
(45) Date of Patent: Oct. 28, 2014

(54) APPLICATION CONFIGURATION MANAGMENT

(75) Inventors: Derek Groothius, Chicago, IL (US); Raja Afandi, Chicago, IL (US); Ross J. Johnson, Chicago, IL (US); Joe Rio, Addison, IL (US); Mike Mazzolini, Clarendon Hills, IL (US)

(73) Assignee: Bank of America Corporation, Charlotte, NC (US)

( * ) Notice: Subject to any disclaimer, the term of this patent is extended or adjusted under 35 U.S.C. 154(b) by 1003 days.

(21) Appl. No.: 12/466,354

(22) Filed: May 14, 2009

Related U.S. Application Data

(60) Provisional application No. 61/127,828, filed on May 14, 2008.

(51) Int. Cl.
*G06F 9/44* (2006.01)
*G06F 9/445* (2006.01)

(52) U.S. Cl.
USPC ........... 717/170; 717/174; 717/168; 717/169; 717/175

(58) Field of Classification Search
None
See application file for complete search history.

(56) References Cited

U.S. PATENT DOCUMENTS

| | | | |
|---|---|---|---|
| 2005/0192979 A1* | 9/2005 | Keller et al. | 707/100 |
| 2007/0055694 A1* | 3/2007 | Ruge et al. | 707/104.1 |
| 2007/0106979 A1* | 5/2007 | Felts | 717/124 |
| 2009/0055804 A1* | 2/2009 | Blaschek et al. | 717/126 |
| 2009/0300580 A1* | 12/2009 | Heyhoe et al. | 717/106 |

* cited by examiner

*Primary Examiner* — Idriss N Alrobaye
*Assistant Examiner* — Ronald Modo
(74) *Attorney, Agent, or Firm* — Banner & Witcoff, Ltd.; Michael A. Springs (57) ABSTRACT

A business entity may operate a computing system having a plurality of computing environments. The computing system may help the business entity to perform one or more business functions. The computing system may have one or more software applications that may help to perform the business function within the computing system. Each software application may have one or more tasks that instruct components of the computing system on how to perform the business function or an aspect thereof. At some times, old software may need to be installed, updated, or replaced with new software. During that time, the software is configured to the computing system's unique characteristics to ensure proper integration. A software configuration management system may help automatically facilitate the new software configuration within the computing environment.

18 Claims, 3 Drawing Sheets

APPLICATION CONFIGURATION MANAGMENT

CROSS-REFERENCE TO RELATED APPLICATIONS

This U.S. Patent Application claims priority to U.S. Provisional Patent Application Ser. No. 61/127,828, which was filed in the U.S. Patent and Trademark Office on May 14, 2008 and entitled "Application Configuration Management." This prior U.S. Provisional Patent Application is entirely incorporated herein by reference.

FIELD OF THE INVENTION

Aspects of the disclosure relate to configuration management of software within a computing system. More specifically, aspects of the disclosure relate to application configuration management systems and methods for a computing system with multiple environments.

BACKGROUND

Computing environments run software that periodically may need updates, revisions, and patches. When new software or a new version of software is installed, it must be configured to operate with the current computing environment. Most software is created for a generic computing environment and the configuration process customizes the software for a particular computing environment. Oftentimes, this customization process is performed manually and is very time consuming. The new software usually is defined by a series of tasks that instruct the components in the computing environment to behave in a particular way or perform a particular function. During the configuration process, each task must be created (usually within a location unrelated to the environment in which the new software is going to be configured), physically moved to the computing environment, and activated within the new computing environment.

Implementation of each phase of the software configuration (creation, deploying/moving to the environment, and activation) leads to many errors and is very time-consuming. Each task is manually moved from the location at which it was created to the target computing environment. An individual task may contain information from any source, including generic information from another computing environment. Sometimes, tasks access generic information or applications to perform the task's function or execute the tasks goals. Delays in progressing from stage to stage of the configuration process reduce efficiency, increase costs, and increase the risk of errors. Mistakes are difficult to find and fix.

The art would greatly benefit from a system that was capable of performing software configuration within a computing environment that has a central system that creates, tracks, and executes different stages of the software configuration process. Additionally, the art would benefit from a central system that may easily identify and remedy a mistake made during the configuration process. Such improvements would result in increased efficiency, a reduction in the amount of time required, and a decrease in the costs associated with configuring software within an environment.

BRIEF SUMMARY OF THE INVENTION

Aspects of the present disclosure address one or more of the issues mentioned above by describing a system and method for configuring software to a computing environment. The following presents a simplified summary of the disclosure in order to provide a basic understanding of some aspects of the systems and methods of a centralized software configuration management system. It is not intended to identify key or critical elements of the invention nor is it intended to delineate the scope of the invention. The following summary merely presents some concepts of the disclosure in a simplified form as a prelude to the more detailed description provided below.

A central application configuration system may comprise: (1) a first set of instructions comprising a plurality of tasks; (2) a plurality of modules that manage the first set of instructions; and (3) a computing system interface for communicating with a computing system. The plurality of modules may include: (1) an environment configuration module for defining a characteristic of the first environment; (2) a release configuration module for identifying common characteristics between the first environment and a second environment; and (3) a deployment manifest module for deploying the first set of instructions within at least the first environment. The first environment and the second environment may be operated by a business entity to perform a business function, but may be applied in any computing environment with software. The central application configuration system may also contain a status module for monitoring the state of completion of at least one task. The state of completion of a first task may trigger the commencement of a second task.

The common characteristics of the central application configuration system that may be obtained by the release configuration may be used to customize at least one task within a first environment and/or a second environment. A testing module may perform a test to determine whether the task has been integrated within the computing environment.

In another example, a method of configuring an application within an environment may include: (1) identifying a plurality of artifacts, wherein at least one artifact including information that is accessible by a plurality of environments; (2) running a first application in a first environment, wherein the first application defines a first task and a second task, at least one of the first task and the second task including information from at least one artifact; (3) defining a second application in a second environment, wherein the second application defines at least a first task and a second task, at least one of the first task and the second task including information from at least one artifact; (4) deploying the second application by moving the second application from the second environment to the first environment; (5) automatically activating the second application upon the completion of the deployment of the second application in the first environment; and (6) automatically deactivating the first application after the activation of the second application in the first environment.

The method of configuring an application within a computing environment may also comprise testing the second set of instructions within the environment. As describe above, a status may be identified and/or assigned to a task or group of tasks defined by the software. The status may represent a level of completion of the software configuration, such as a successful completion of the deployment phase of the first set of computing instructions.

In yet another example, a method of configuring new software within a computing environment may comprise steps of: (1) identifying the location of old software within the computing environment; (2) creating the new software at a staging location, the staging location being discrete from the computing environment, wherein the new software comprises a first task and a second task; (3) physical moving of the first task from the staging location to the computing environment; (4)

physically moving the second task from the staging location to the computing environment; (5) deactivating the old software; and (6) activating the first task and the second task. Each of the aforementioned steps may be managed by a centralized configuration system that automatically facilitates the progression of the configuration of the new software to the computing environment. The steps may be performed in any suitable order. One step may depend on the completion of a subsequent step. The steps may be organized in a hierarchy that defines a progression of steps along the configuration process. Validating the new software may occur while the old software is operating. The deployment of the new software may overwrite the old software only when indicated to do so.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various example embodiments of the invention, reference is made to the accompanying drawings, which form a part hereof, and in which are shown by way of illustration various example devices, systems, and environments in which aspects of the invention may be practiced. Additional specific arrangements of parts, example devices, systems, and environments may be utilized and structural and functional modifications may be made without departing from the scope of the present invention. The various figures in this application illustrate examples of a central software or "application" configuration system. When the same reference number appears in more than one drawing, that reference number is used consistently in this specification and the drawings to refer to the same or similar parts throughout.

Computing systems often comprise computer hardware and computer software. Computer hardware may be the physical components that comprise a computer such as circuitry, memory, input and output devices, and the like. Computer programs or software may be a set of instructions for the computer hardware to perform. The computing system may require computer software to provide instructions to one or more components of the computer hardware. The software may contain instruction that requires the computer hardware to perform a set of instructions in a particular order.

A hardware component may be a computer processor that is a central unit capable of executing computer programs. In essence, the computer processor may receive a set of instructions (e.g., a computer program in a computer code language) that may be stored on a computer memory. The computer memory may be any suitable memory, as described below.

The computing system may also comprise a computer processor that may perform a plurality of functions including, but not limited to: (1) fetching information relating to an instruction from a program memory; (2) decoding the information from the instruction (breaking up the instruction into portions having significance to the computing system hardware or other software); (3) executing the instructions that instruct the computer hardware to behave or function in a particular way; (4) storing the information relating to the result of the executed instructions; and (5) communicating the information throughout the computing system.

As described above, computing systems may include software that may be adapted to an environment. The environment may be any environment, including but not limited to, a computer, a computing system, and/or a network of computers. Some software may be classified as either operating system software or application software. Operating system software may permit a computing system and its corresponding computer hardware to receive and execute instructions from application software. The computing system may also include firmware that provides a communication forum between the pieces of computer hardware and the operating system or application software.

Computing systems may also include application software that may be any set of instructions including, but not limited to, word processing, image processing, computer network browsing, database processing, disk compression, data storage, faxing, and the like. The application software may also be one or more applications that communicate with each other or another part of the computing system. For example, middleware may provide a forum for application software to communicate with operating system software. Middleware may also "enable" a plurality of application software to operate on the operating system software or may provide a forum on which a plurality of application software may communicate with each other.

In some examples, either or both of operating system software and application software may be customized to a particular environment. Some example environments may blend functions that are conventionally performed by operating system software and application software. Some functionality and instructions or portions of instructions may be shared between an operating system software and application software for a computing system. For example, an instruction or piece of information may be necessary or useful to more than one related or otherwise unrelated portion of the computing system. Information may be shared between more than one component of the computing system and may be stored at a location accessible by the computing components that may use the information. The information also may be directly shared between the components that may need information common to more than one application or computing component.

The computer hardware and any type of software may share an interface. The interface may provide a medium over which the software may provide instructions to the hardware to perform a function (such as a processor or other execution component may direct the operation of various hardware and software components of the computing system). The software may be configurable with other software and with the hardware in a particular environment. Deploying software into an environment requires careful planning and integration between all affected components, as described below.

The software may perform any suitable function. For example, the software may be implemented within a business entity for providing assistance to perform a business function. The software may perform calculations, organize information, track transactions, manage production, monitor product quality, or any other business function. The business function may be an interaction between the business entity and a third party, such as a client or customer. The business function may also be an internal function within the business entity itself.

An internal function may support the business entity's portion of an interaction between the business entity and a third party.

Figure 1:
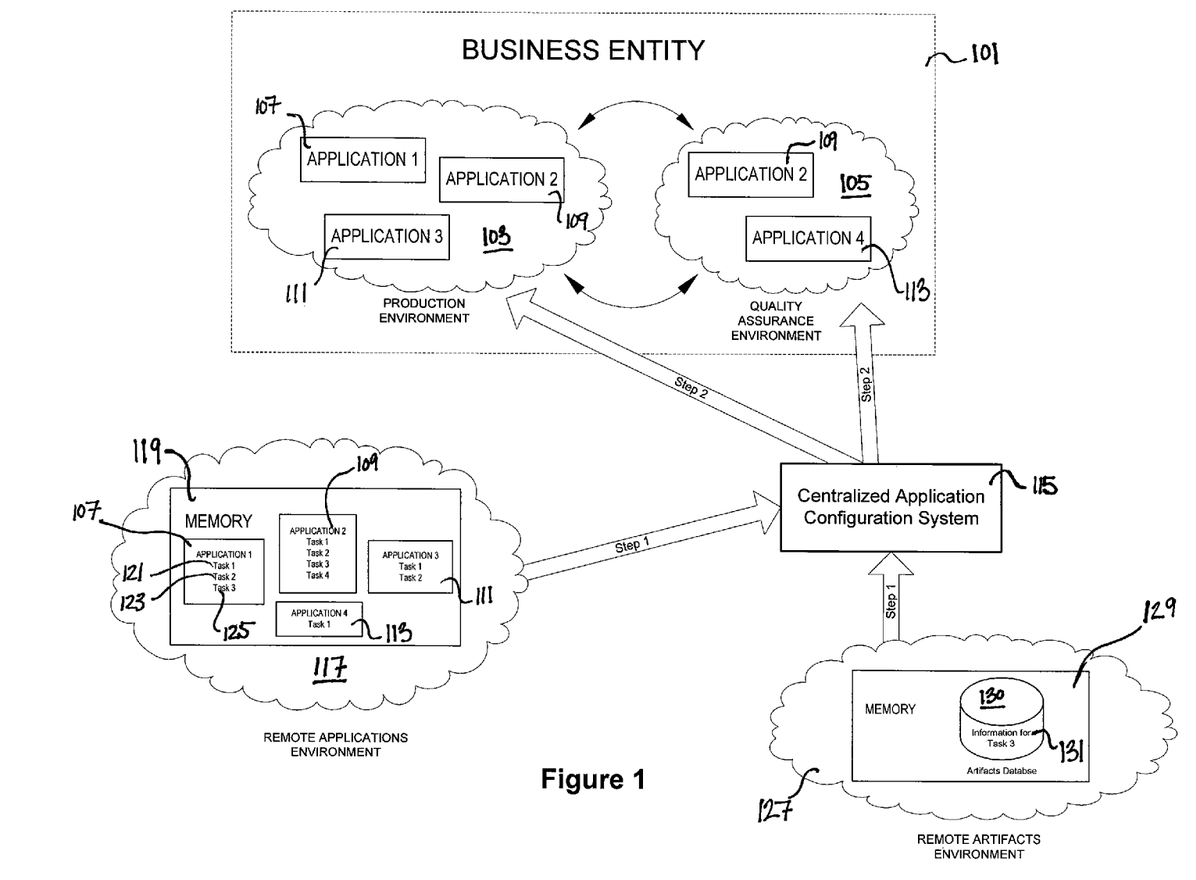
FIG. 1 depicts a relationship between a business entity and a centralized application configuration system, in accordance with the present invention.

FIG. 1 illustrates a business entity having two environments: a production environment 103 and a quality assurance environment 105. The business entity may produce a product and may have a plurality of environments within its computing system that are dedicated to the management of the production of the product or service. Each department may have the responsibility to perform a different portion of the management of the product's production, such as the example production environment 103 and the quality assurance environment 105. The production environment may provide software for assisting the business entity in performing the necessary functions to produce the product or service, such as the first application 107, the second application 109, and the third application 111. The quality assurance environment may provide software for assisting the business entity during analysis of the quality of the product or service, such as the second application 109 and a fourth application 113.

The production environment(s), the quality assurance environment(s), and development environment(s) may operate independently, yet have a common goal of accomplishing a business function for a business entity. All of the environments help the business entity manage the production of the product and/or service. Some business entities may have additional environments that manage particular aspects of the product or service.

A centralized application configuration system 115 may manage the implementation of software into one or more environments of the business entity 101. As illustrated in FIG. 1, a remote applications environment 117 may have a memory 119 capable of storing applications. For example, the memory 119 may be a location at which an application is staged or "created." The first application 107 may be defined by a first task 121, a second task 123, and a third task 125. The tasks may be defined within the remote applications environment 117. Tasks relating to the second application 109, the third application 111, and the fourth application 113 may also be created within the remote applications environment 117.

Each task may comprise instructions for operating components of the computing environments within the business entity 101. The information for a task may be obtained from any source. For example, a task may be created by a human programmer. In another example, the instructions defined within the task may be obtained from a shared environment, such as an artifact. In FIG. 1, a remote artifacts environment 127 may include a memory 129 that is capable of storing an artifacts database 130 for storing information relating to the third task. The information contained in the third task 131 and stored in the artifacts database 130 may be included within the instructions for a third task of an application. The third task may be utilized in more than one application and may be common or generic information. The artifacts database 130 may be accessible by any suitable computing component.

Once the applications are defined (created), they may be physically moved to one or more environments within the business entity 101. Physical movement of the applications may be managed by the centralized application configuration system 115, as illustrated in FIG. 1. For example, the centralized application configuration management system 115 of FIG. 1 identifies the first application 107, the second application 109, the third application 111, and the fourth application 113 on the remote applications environment 117.

In an embodiment, this disclosure relates to simplifying configuration management for a computing environment that may be implementing one or more software components. As described above, a business entity 101 may have one or more computing environments for conducting business functions. A configuration management system may simplify the management of configuring any new type of software one or more of the computing environments.

New software for a computing environment may be a full release mode or a patch release mode. The full release mode is a replacement of the old software with the new software. The patch release mode is a partial replacement or an update of the old software with the new software. The configuration management system may consolidate management of the software components through each of the stages of the software deployment (staging phase, deploying phase, and activating phase) and facilitate the transition between each step of the configuration process.

The configuration management system may be centralized and may serve as a single invocation that automates the deployment process and configures the new software to one or more computing environments. Such centralized automation may reduce the risk of errors associated with manual or multi-invocation systems. The automation of the centralized configuration may increase the efficiency of the deployment of new software. The centralized, single invocation model may streamline the deployment of the application's configuration through each stage of the deployment process.

A central configuration system may comprise three components—the environment configuration, the release configuration, and the deployment manifest—that merge at deployment time. The central configuration management system may provide a forum for managing run-time configurations, making deployments repeatable, cutting software system infrastructure build out times (and thereby reducing overall development life cycle duration and minimizing application environment errors). There is also a reduction of cost associated with managing the development life cycle that is reduced. And lastly, a there is an assumed reduction in risk through automation and repeatability.

The central configuration management system may manage configuring software with a computing system in any of several modes of software releases, such as a full release mode or a patch release mode. The full release mode typically replaces software or a portion thereof, whereas the patch release will replace or add to the existing software. In any mode, the centralized configuration of the software may be implemented in three stages: staging, deploying, and activating. Each of these stages may be performed consecutively or in any suitable order. For example, during a first iteration of implementing new software, the central configuration system may perform the staging stage first, the deploying stage second, and the activating stage third. In another example, the staging stage may be performed first, and then several deploying stages may be performed, followed by the activating stage. The several deploying stages may be performed to test alternative solutions to a known problem before activation occurs.

The staging stage of the software configuration may define one or more tasks that include instructions for operating within a computing system. The tasks may reference information stored in one or more artifacts or may incorporate one or more artifacts into the deployment process. The staging stage may prepare the software for physical transfer to the target environment during the deploying phase of the software configuration. The staging stage may also evaluate the configuration of the new software being released.

The deploying stage of the software configuration may include moving the tasks or literal instructions for the new software to the physical location at which it is going to be implemented (usually at the same or a similar location where the old or previous version of software currently operates). The deploying stage may serve as a test stage for the software that occurs before the software is activated with the current system. During the deploying stage, the new software may exist with, yet independently of the currently operating system. The deploying stage may test the compatibility of the new software with the current system and/or fix any discovered problems. This staging stage can also be used to evaluate the configuration of the new software being released.

The activating stage oftentimes occurs when the software is ready to operate within the computing system. In some examples, the new software is replacing old software with similar functionality. In a software patch example, the new software may be activated without deactivating the previous version. Whereas, a full software release may require that the previous version of software is deactivated before activating the new software. Typically, the known problems in the software have been identified and/or fixed. In some examples, the software may progress into the activating stage with known problems. Ideally, the software would progress into the activating stage without known problems; however, perfection of the software is not often possible.

The various embodiments of the present disclosure may be computerized and may operate by employing computer software. Computer software may be any collection of computer programs, instructions, documentation, or other information that may be stored, executed, or otherwise utilized by a computing system and/or by a computing device. Some computer software may be used as an interface with the computer hardware that may physically execute, store, or the like, the information from the computer software. Computer applications may provide instructions to the computing hardware to perform computer-controlled and/or user-controlled tasks. The computer applications may be deployed in any environment, including the computing system and the user-controlled system.

Figure 2:
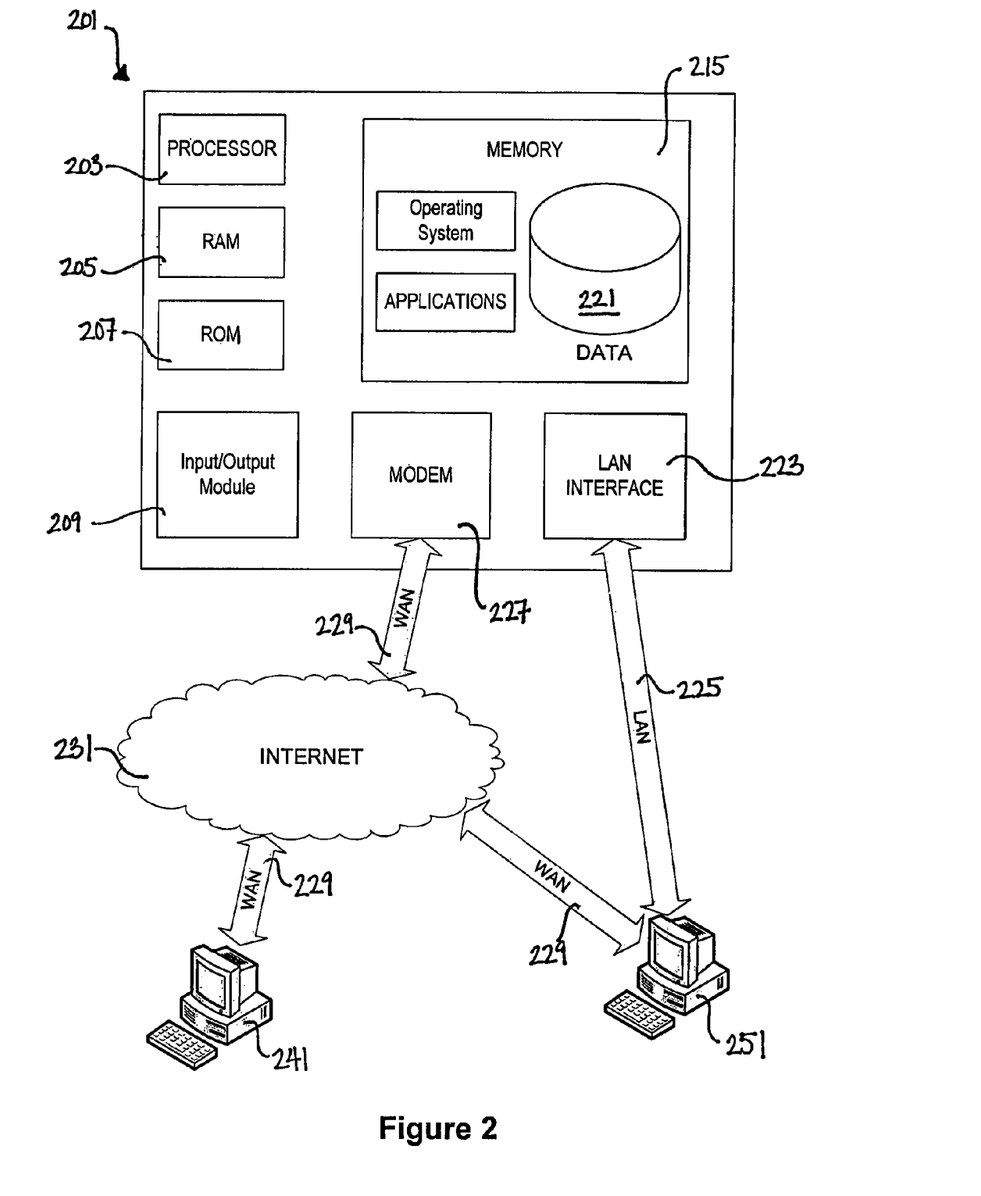
FIG. 2 shows an example computing system, according to aspects of the invention.

An example computing system environment is illustrated in FIG. 2 into which the software application may be configured. The computing system may include one or more computing devices 241, 251 that may communicate with each other over a network. The computing system environment 100 may include a computer 201 having a processor 203 for controlling overall operation of the computer 201 and its associated components, including RAM 205, ROM 207, an input/output module or BIOS 209, and a memory 215. The computer 201 typically includes a variety of computer readable media. The computer readable media may be any available media that may be accessed by the computer 201 and may include both volatile and nonvolatile media and removable and non-removable media. By way of example, and not limitation, computer readable media may comprise one or more software applications.

The software (or computer storage media) may include volatile and nonvolatile and removable and non-removable media implemented in any method or technology for storage of information such as computer readable instructions, data structures, program modules, or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, and any other medium that can be used to store the desired information and that can be accessed by the computer 201.

Communication media may embody computer readable instructions, data structures, program modules, and/or other data in a modulated data signal such as a carrier wave or other transport mechanism. It may also include any information delivery media. Modulated data signal is a signal that has one or more of its characteristics set or changed in such a manner as to encode information in the signal. Communication media may include wired and wireless media.

The input/output module or BIOS 209 may include a microphone, keypad, touch screen, and/or stylus through which a user of the computer 201 may provide input. The input/output module or BIOS 209 may also include one or more of a speaker for providing audio output and a video display device for providing textual, audiovisual, and/or graphical output.

The computer 201 may operate in a networked environment that facilitates communication between one or more remote computers, such as computing devices 241 and 251. The computing devices 241 and 251 may be personal computers or servers that include many or all of the elements described above relative to the computer 201. The network connections depicted in FIG. 1 may include a local area network (LAN) 225 and a wide area network (WAN) 229 and may also include other networks. The computer 201 is connected to the LAN 225 through a network interface or adapter 223. The computer 201 may be a server and may include a modem 227 or other means for establishing communications over the WAN 229. For example, the computer 201 may connect to a WAN 229 such as the Internet 231 through a modem connection. The network connections may include any communications link between computers.

The computer network 231 may be any network that interconnects users and/or computing devices 241, 251. According to at least one aspect of the invention, the computer network 231 may provide shared access by two computing devices to at least a portion of the data in the plurality of modules. Shared access may be two or more computing devices 241, 251 that may be coupled to the computer network 231 and/or that may be able to communicate with each other and/or access, change, and add data to a data file 221.

The computer 201 may include memory 215 for storing computer-readable instructions and a processor 203 for executing the computer-executable instructions within a particular environment. The computer-executable instructions may be data in the form of program source code that may be capable of modifying the data file 221. The computer-executable instructions may be a series or sequence of instructions for a computing device or a software application to execute a computing function within an environment.

The processor 203 may be capable of executing the computer-executable instructions within an environment. The server 201 may store the data in the data file 221. The data file 221 may be stored in the memory 215 so that it may be accessible to a plurality of computing devices 241, 251 within its own environment or from a computing device external to the environment.

The computer-executable instructions may be a series or sequence of instructions for a computing device 241, 251, described in detail throughout this disclosure. The processor 203 may be configured to execute the computer-executable instructions that may be used to monitor an executable software application. Such computer-executable instructions may be located (e.g., physically or logically) in modules in the memory 215.

A computer network, such as the Internet 231, may provide access to the environment, including sharing information between the computing devices 241, 251. Additionally, the computer network may be public or private and may be wired or wireless. The computing devices 241, 251 that are coupled to the computer network may be any electronic device that is capable of connecting to a computer network and transmitting data over the computer network. Further, the computing devices may be capable of receiving data for entry into a data file 221 that may be associated with a computing system.

As described above, one or more "artifacts" may be identified within a computing environment. Each artifact may define computing information, instructions, or an application (such as middleware). The information or instructions may be related to or obtained from any source and may be stored on a memory that is accessible by computing systems from many different environments. The artifact may be utilized to operate another application software within the computing system. The artifacts may be reusable pieces of information that may be utilized in one or more environments. The artifacts may be customized for an environment to accommodate any unique features of an environment. The reusable information may be used as a template, and then customized for a particular environment.

For example, an artifact may identify an Internet Protocol (IP) address for a computing device located in a first environment that performs a function for a computing system while the second environment may require a different IP address yet perform the same function (such as a piece of middleware software). The output produced by utilizing information in an artifact may be applied to many different computing environments. Artifacts may be likened to a series of generic building blocks that are accessible and usable by any authorized computing environment.

Artifacts may be used during the configuration of new software within a computing environment. The new software may define a series of tasks that may define the new instructions or parameters of the software mode. The tasks may utilize information or applications from an artifact to execute a function. The series of tasks may be unique to a particular computing environment and may benefit from using generic information that may be commonly available in an artifact located at a shared location.

Figure 3:
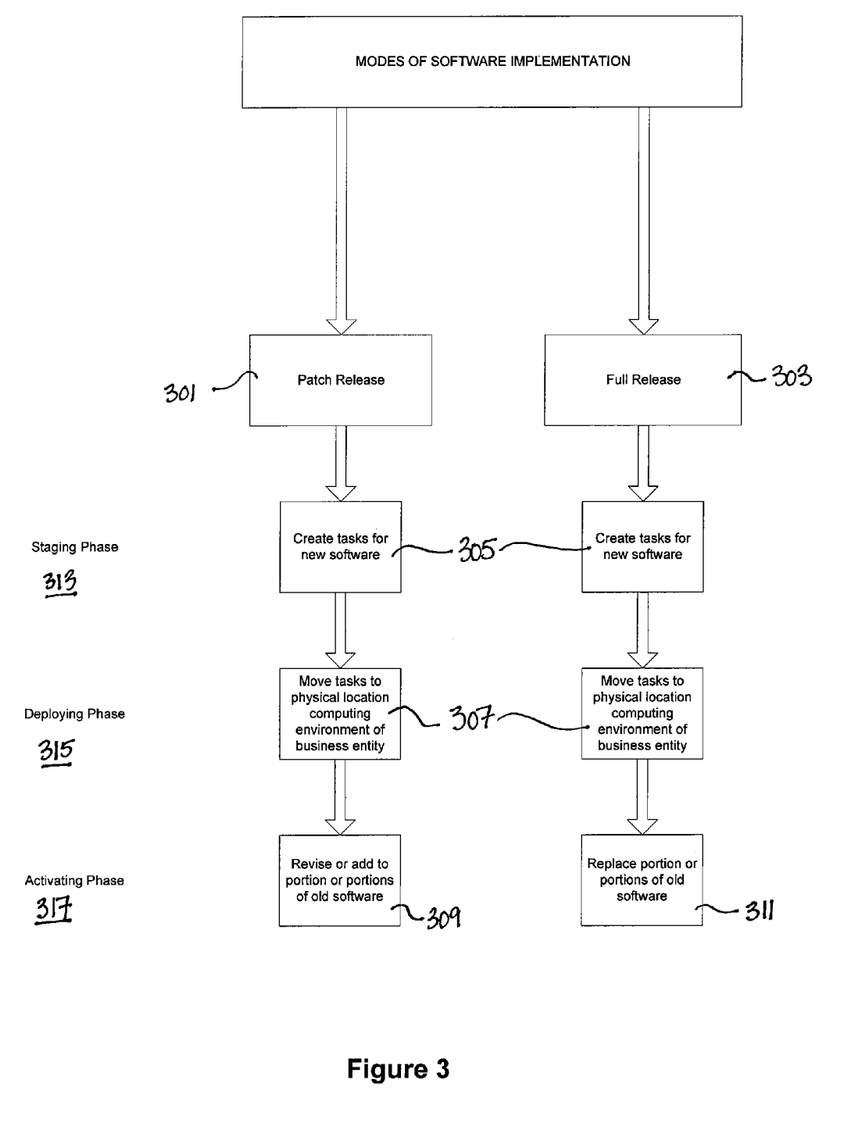
FIG. 3 illustrates phases of the configuration of an application within an environment, according to aspects of the invention.

As illustrated in FIG. 3, the configuration of the system may have one or more phases. The phases may correlate to one or more tasks. The phases may include a staging phase 313, a deploying phase 315, and an activating phase 317. During the staging phase 313, one or more tasks may be created or identified 305 to facilitate the configuration of one or more software applications within a computing environment. As described above, the software may be a full release mode 301 or a patch release mode 303.

During the staging phase 313, one or more tasks may be created. The tasks may be capable of being deployed as an application on a computing device or a computing system. The tasks may be created on a computing device that is remote from the environments of the business entity, such as a remote server. In some examples, the creation of the tasks defining the software applications is performed by a third party, such as a computer programmer.

The tasks may originate from any source including, but not limited to, a user, a computing system, another application or software system, or any other source and may be organized into a phase of a software configuration within an environment. For example, the tasks may be identified or created through a build cycle or a version control system, commonly used to implement such a software configuration. The tasks may be compiled during the staging phase and may become input for any other phase of the configuration. The staging phase may place the tasks in a particular order or may provide information relating to the order in which the tasks may be positioned.

The configuration of the system may also have a deploying phase 315. The deploying phase 315 may physically move one or more tasks into an environment or a group of environments. An environment may include a physical file system that may reside on the hardware of the computing system and/or computing device on which the software system may be deployed. The series of tasks may be moved onto the physical file system. The physical file system may have a new series of tasks and an old series of tasks. The old series of tasks may be positioned upon the physical file system and may run the current version of the software system. The new series of tasks may be moved onto the physical file system 305 in any suitable fashion. When such a move occurs, the new series of tasks may replace the old series of tasks 311. In an alternative embodiment, the new series of tasks may operate concurrently with the old series of tasks. Any suitable combination of the new series of tasks and the old series of tasks may be used for the software system. The new series of tasks may also revise and/or amend 309 any portion of the old series of tasks (including revising nothing or completely replacing the old series of tasks).

The configuration of the system may have an activating stage 317 as well. The activating stage 317 may activate the software system (make the new software ready for use by the environment). The activating stage 317 may include commencing operation of the new software (series of tasks) and ceasing operation of the old software. Any phase of managing configuration of a software system may be implemented. For example, any suitable combination of the staging phase 313, the deploying phase 315, and/or the activating stage 317 may be included in the application configuration. Additional phases may be added to the application configuration process.

The centralized application configuration management system may regulate and distribute instructions during each phase of the application configuration within the computing environment. The central configuration system may include one or more configuration files. For example, the configuration files of the central configuration system may include an environment configuration file, a release configuration file, and a deployment manifest file. The environment configuration file may be utilized to manage and/or define an environment. Each environment may be defined by one or more unique features, e.g., server location, development, system integration, quality assurance, performance testing, and production. Each of the environments may include a unique configuration. Any suitable configuration may be utilized.

The central configuration system may also include a release configuration file. The release configuration file may contain data or information that may define characteristics that may be common to each environment in which the software system is being deployed. The release configuration file may identify common values for such characteristics. The release configuration file may also identify a common database or common database parameters relating to the configuration of the software system for each environment in which the software system may be deployed. Any values or information identified as being useful to another software configuration or computing environment may be stored as an artifact for use by another computing system environment ("shared" information).

The central configuration system may include a deployment manifest file. The deployment manifest file may define each task in the series of tasks that may be deployed within the environment or group of environments. In essence, the aggregation of these tasks may define the software system. The deployment manifest file may define tasks from any source. An entry relating to each task fact may be defined within the deployment manifest file. For example, a task may have a source, a destination file, and a source type. The source may be the location at which the task may be found on the hardware. The destination file may be the relative location on the server in which the task may be found. The artifacts and the information in the deployment manifest file may be shared in any suitable manner between environments or phases of the deployment of the software system.

The centralized application configuration system, as a whole, may operate to provide input to one or more phases of the software system within a computing environment. In some example processes, a hierarchy of the processes and configuration files may be established. For example, the environment configuration file may take precedence over the release configuration file. The deployment manifest file may contain different information than either the release configuration file and/or the environment configuration file. Any suitable configuration of the process may be implemented.

Within each phase of the configuration of the software system, a workflow process may be implemented. In some example processes, the workflow process is a conventional process commonly implemented in the art of software configuration. A portion of the workflow process may correspond to the staging phase, as described above. Another portion of the workflow process may correspond to the deployment phase, which is also described above. A third portion of the workflow process may correspond to the activating stage, described above. A workflow engine may facilitate a smooth transition between each stage of the application configuration. Workflows are not limited to the phases described above.

A workflow engine may facilitate one or more stages of the software configuration. The workflow engine may define one or more tasks that comprise a business function performed by software within the computing environment described above. The workflow engine may also comprise support for a business infrastructure. For example, the workflow engine may facilitate a particular business function (such as performing a quality inspection for a defined project). In another example, the workflow engine may facilitate the business infrastructure. Business infrastructure may provide the components of the business that may be needed to perform one or more business functions. For example, the business infrastructure may support the continuing operation of a component of the business, such as the quality inspection component, production component, customer relations component, etc. A business function may utilize one or more components of the business infrastructure to perform the assigned task. The workflow engine may support and facilitate the operation of any or all of these business functions and business infrastructure.

The workflow engine may perform the "processing" of the instructions within the task. The workflow engine physically engages the computing components to accomplish the task's instructions. The workflow engine facilitates the progression between tasks and the interaction between components of the business infrastructure.

The workflow engine may be generic or may be customized to process the tasks for a particular environment or group of environments. A generic workflow engine may be implemented in any computing environment for configuring software. A customized workflow engine may be tightly coupled to the tasks that are executed during the configuration process. A generic system may offer processing features that are not needed by a particular environment, although the generic workflow engine may be easily integrated within a variety of systems. In some example systems, a customized workflow engine is beneficial because it increases efficiency while decreasing risk and complexity of the system.

The workflow engine may provide the centralized application configuration management system with an option to extend the application configuration to more environments. For example, the additional processing capabilities may be integrated within a customized workflow engine if another phase is added to the application configuration by creating the necessary logic to execute the instructions with one or more tasks. A generic workflow engine may or may not be able to accommodate the same "add-on" functionality that a customized workflow engine may be able to do.

The workflow engine may monitor a status or "state" of one or more tasks defined by the software. The state of a task may relate to the level of completion of the task. For example, a task that has been completed successfully may be assigned a state of "complete;" a task that has been completed unsuccessfully may be assigned a state of "failed;" a task that is being processed, but is incomplete may be assigned a state of "pending" or "in process;" a task that is awaiting execution may be assigned a state of "not yet begun." Any suitable description may be assigned to a reflect a task's state.

The deployment stage of the application configuration may include deploying the new software within the computing environment. Each computing environment may be unique and may require customization of one or more tasks that define the new software. Each environment involved in an application deployment may have different configuration requirements. The centralized management system may facilitate each environment's unique configuration requirements by integrating the application configuration to function within each individual environment and promoting the ability to reuse an application for another environment.

The centralized application configuration management system may have application configuration files that may be designated as input to a template. When each configuration file is applied to a particular environment, a template engine may individualize the configuration file to the particular needs of an environment. The output of the template engine may be a set of instructions that is based upon the template artifact yet may be customized to the target computing environment.

The centralized application configuration management system may also have an artifact template that may be received as input to a template engine. The template engine may utilize the artifact template and information from one or more tasks of the new software to create an output that is unique to the computing environment. The template engine may be capable of receiving input from an artifact template, an artifact, a task, or any other unique information relating to the computing environment. The template engine may be capable of accepting any suitable input and creating usable, customized instructions or tasks for the target computing environment. For example, the template engine may provide simple template language that may reference computer code. The output of the template engine may be a configuration task. The configuration task may be staged in the same manner as any other task used to define the software.

Each task defined by the software may be associated with a status. The status may indicate whether the task has been executed, whether problems occurred during the task, and the like, as described above. The status of one or more tasks may be compiled in a report. The report may be continuously updated as the software system is configured to the environment.

The tasks may incrementally replace or add new instructions or "tasks" to the target computing environment. The deploying phase of the software configuration utilizes this incremental nature of the tasks to accomplish the ultimate goal of complete software configuration within the computing environment. For example, each task is physically moved from a first location within a first computing environment to a second location within a second computing environment. The second computing environment defines the location of the old software that is being replaced by the new software during the configuration process. The movement of each task may be triggered by any criteria, such as a completion of a previous task, an expiration of a time period, or the like. The deployment of a first task may depend upon the successful deployment of a second task. The engines described above facilitate the progression of the application configuration from a first task to a second task, and so on.

After all of the tasks have been physically moved to the target computing environment, the tasks, as a whole or in part, may be validated. The validating optionally may include identifying and fixing mistakes before the new software (series of tasks) is activated within the new environment. The validating verifies that the tasks perform their intended function.

Throughout any stage of the staging, deploying, and activating stages, a status may be identified. The status may be any status that represents the level of configuration of the new software with the computing environment. A status may be assigned to the entire software configuration and/or any portion thereof. A report may be generated regarding the status of the software configuration process. A status of a first task may trigger the commencement of a second task.

In a specific example, central configuration system may comprise: (1) a first set of instructions comprising a plurality of tasks; (2) a plurality of modules that manage the first set of instructions; and (3) a computing system interface for communicating with a computing system. The first set of instructions may be a software application, as described above. The plurality of modules may include an environment configuration module, a release configuration module, and the deployment manifest module. Each of the modules may be managed by a workflow module.

As described above, the environment configuration module may manage and/or define an environment within a business entity. The release configuration module may contain data or information that may define characteristics and values that may be common to a plurality of environments within the business entity's computing system, as described above. The deployment manifest module may define each task in the series of tasks comprising a software application that may be deployed within the environment or group of environments of a business entity, which is also described above.

In another aspect of the invention, a method of configuring an application within a computing environment may comprise the steps of: (1) identifying a plurality of artifacts, wherein at least one artifact including information that is accessible by a plurality of environments; (1) defining a first application at a first location in a first environment, the first task including information from at least one artifact; (3) defining a second application at a second location in a second environment, the second task including information from at least one artifact, wherein the second application defines at least a first task and a second task; (4) moving the second application from the second location to the first location; (5) completing the first task of the second application; (6) commencing the second task of the second application; (7) completing the second task of the second application; (8) automatically activating the second application after the upon the completion of both of the first task and the second task; and (9) automatically deactivating the first application after the second application has been activated.

In yet another aspect of the invention, A method of configuring new software within a computing environment, comprising the steps of: (1) identifying the location of old software within the computing environment; (2) creating the new software at a staging location, the staging location being discrete from the computing environment, wherein the new software comprises a first task and a second task; (3) physical moving of the first task from the staging location to the computing environment; (4) physically moving the second task from the staging location to the computing environment; (5) deactivating the old software; and (6) activating the new software. The deploying step may comprise: testing the first task within the computing environment and assigning a first status to the first task; and testing the second task within the computing environment and assigning a second status to the second task. Each of the steps may be managed by a centralized configuration system that may automatically facilitate the progression of the configuration of the new software to the computing environment.

Aspects of the invention have been described in terms of illustrative embodiments thereof. Numerous additional embodiments, modifications, and variations may exist that remain within the scope and spirit of the appended claims. For example, the steps illustrated in the systems and methods may be performed in other than the recited order and that one or more steps illustrated may be optional. The methods and systems of the above-referenced embodiments may also include other additional elements, steps, computer executable instructions, or computer-readable data structures. In this regard, other embodiments are disclosed herein as well that can be partially or wholly implemented on a computer readable medium, for example, by storing computer executable instructions or modules or by utilizing computer readable data structures. The illustrated system and methods may operate independently or may operate as a portion of a larger system and/or method.

The aforementioned system may be deployed in any environment in which an application may need to be configured. Many systems may have a need for deploying a new application or an upgraded/revised application. For example, the system and method may be utilized by a financial institution or group of financial institutions. The system and method of managing the configuration of an application may be utilized in any suitable environment.

We claim:

1. A central configuration system for identifying and customizing software in a first environment with a first and second task defining new software in a second environment, wherein the central configuration system comprises:

an environment configuration module including an environment configuration processor for defining a characteristic of the first environment;

a release configuration module including a release configuration processor for identifying common characteristics between the first environment defined by the environment configuration module and a second environment to customize the first and the second task; and a deployment manifest module including a deployment manifest processor for defining and deploying the first task and the second task within at least the first environment; and a workflow module including a workflow processor that manages the modules and automatically transitions and performs:
  during a staging phase:
    identifying common characteristics and configuration settings between a first environment and a second environment using the release configuration module;
    identifying a location of old software to be customized within the first environment; and
    identifying the first and second task of the new software in the second environment by using the deployment manifest module;
  during a deployment phase:
    physically moving the first task from the second environment to the first environment; and
    physically moving the second task from the second environment to the first environment; and
  during an activation phase:
    deactivating the old software; and
    activating the first task and the second task.

2. The central configuration system recited in claim 1, wherein the first task and the second task form a first set of instructions and wherein the first set of instructions is a new version of a second set of instructions.

3. The central configuration system of claim 2, further comprising a status module including a status processor for monitoring the state of completion of the first set of instructions.

4. The central configuration system of claim 3, wherein the second task commences after the first task is complete.

5. The central configuration system of claim 2, wherein the deployment manifest module is also for deploying the first set of instructions within the second environment.

6. The central configuration system of claim 2, wherein the deployment manifest module deploys the first set of instructions within the first environment and within the second environment.

7. The central configuration system of claim 2, further comprising a validating module including a validating processor for validating the first set of instructions in the first environment.

8. The central configuration system of claim 1, further comprising a testing module including a testing processor for testing the first set of instructions after the first set of instructions is deployed in the first environment.

9. The central configuration system of claim 1, where the first task is deployed before the second task is completed.

10. The central configuration system of claim 1, where the second task is deployed after the central configuration system has received notification that the deployment of the first task is complete.

11. A method comprising:
accessing a central configuration system to identify and customize software in a first environment with a first and second task defining new software in a second environment, wherein the central configuration system, comprises:
  an environment configuration module including an environment configuration processor for defining a characteristic of the first environment;
  a release configuration module including a release configuration processor for identifying common characteristics between the first environment defined by the environment configuration module and a second environment to customize the first and the second task; and
  a deployment manifest module including a deployment manifest processor for defining and deploying the first task and the second task within at least the first environment; wherein the modules are managed by a workflow module that automatically transitions between a plurality of stages to customize and deploy the first and second tasks; and
invoking the workflow module to customize and deploy the new software, by automatically transitioning and performing:
  during a staging phase:
    identifying common characteristics and configuration settings between a first environment and a second environment using the release configuration module;
    identifying the location of old software to be customized within the first environment; and
    identifying the first and second task of the new software in the second environment by using the deployment manifest module;
  during a deployment phase:
    physically moving the first task from the second environment to the first environment; and
    physically moving the second task from the second environment to the first environment;
  during the activation phase:
    deactivating the old software; and
    activating the first task and the second task.

12. The method of claim 11, further comprising testing the second application within the first environment before the first application is deactivated.

13. The method of claim 12, further comprising associating a status with the deployment of the new software within the first environment.

14. The method of claim 13, wherein the status includes a complete status that represents successful completion of deploying the new software within the first environment.

15. A non-transitory memory device comprising a set of instructions that when executed perform the steps of:
accessing a central configuration system to identify and customize software in a first environment with a first and second task defining new software in a second environment, wherein the central configuration system, comprises:
  an environment configuration module including an environment configuration processor for defining a characteristic of the first environment;
  a release configuration module including a release configuration processor for identifying common characteristics between the first environment defined by the environment configuration module and a second environment to customize the first and the second task; and
  a deployment manifest module including a deployment manifest processor for defining and deploying the first task and the second task within at least the first environment; wherein the modules are managed by a workflow module that automatically transitions between a plurality of stages to customize and deploy the first and second tasks;
invoking the workflow module to customize and deploy the new software, by automatically transitioning and performing:
  during a staging phase:

identifying common characteristics and configuration settings between a first environment and a second environment using the release configuration module;

identifying the location of old software to be customized within the first environment; and identifying the first and second task of the new software in the second environment by using the deployment manifest module;

during a deployment phase:

physically moving the first task from the second environment to the first environment; and physically moving the second task from the second environment to the first environment;

during the activation phase:

deactivating the old software; and activating the first task and the second task.

16. The device of claim 15, wherein the steps of physically moving the first task and the second task are completed before the step of activating the first task and the second task is commenced.

17. The device of claim 15, wherein the centralized configuration system assigns a hierarchy of the steps of the progression of the configuration of the new software to the second environment.

18. The device of claim 15, wherein the new software is validated within the first environment before the old software is deactivated.

* * * * *